United States Patent [19]
Louis

[11] Patent Number: 5,372,441
[45] Date of Patent: * Dec. 13, 1994

[54] ERGONOMIC KEYBOARD APPARATUS WITH LEFT AND RIGHT KEY SECTION SEPARATED BY AN IRREGULARLY SHAPED SPACE

[75] Inventor: William M. Louis, Encinitas, Calif.

[73] Assignee: TypeRight Keyboard Corporation, Encinitas, Calif.

[*] Notice: The portion of the term of this patent subsequent to Apr. 12, 2011 has been disclaimed.

[21] Appl. No.: 91,811

[22] Filed: Jul. 13, 1993

Related U.S. Application Data

[63] Continuation of Ser. No. 990,021, Dec. 14, 1992, Pat. No. 5,302,040, which is a continuation-in-part of Ser. No. 659,604, Feb. 21, 1991, abandoned.

[51] Int. Cl.$^5$ ............................................. B41J 5/10
[52] U.S. Cl. ................................. 400/489; 400/472; 400/486; 345/168; 341/22
[58] Field of Search ............... 400/472, 485, 486, 487, 400/488, 489, 715; 235/145 R, 145 A, 146; 340/711; 341/22; 345/168, 172

[56] References Cited

U.S. PATENT DOCUMENTS

| | | | |
|---|---|---|---|
| 3,698,532 | 10/1972 | Dodds | 400/486 |
| 4,121,048 | 10/1978 | Dev Choudhury | 400/486 X |
| 4,669,903 | 6/1987 | Herzog et al. | 400/489 |
| 5,040,757 | 8/1991 | Benaway | 400/715 X |
| 5,119,078 | 6/1992 | Grant | 400/488 X |
| 5,129,747 | 7/1992 | Hutchison | 400/489 |
| 5,143,462 | 9/1992 | Klauber | 400/486 |
| 5,145,270 | 9/1992 | Darden | 400/488 |
| 5,156,475 | 10/1992 | Zilberman | 400/472 |
| 5,163,646 | 11/1992 | Engelhardt | 400/715 X |

FOREIGN PATENT DOCUMENTS

| | | | |
|---|---|---|---|
| 0972465 | 10/1959 | Germany | 400/489 |
| 0332476 | 7/1930 | United Kingdom | 400/486 |
| 2122947 | 1/1984 | United Kingdom | 400/472 |

*Primary Examiner*—Edgar S. Burr
*Assistant Examiner*—Christopher A. Bennett
*Attorney, Agent, or Firm*—Bernard L. Kleinke; Jerry R. Potts

[57] ABSTRACT

A keyboard arrangement with a pair of angularly disposed, spaced apart groups of character keys dedicated for operating use respectively by the left hand and the right hand of a user. A space bar key is operable by either thumb of the user and bridges between the two groups of character keys. The rows of keys in each group are staggered, and each key bears character indicia disposed at an angle to the transverse direction of its group of keys.

13 Claims, 5 Drawing Sheets

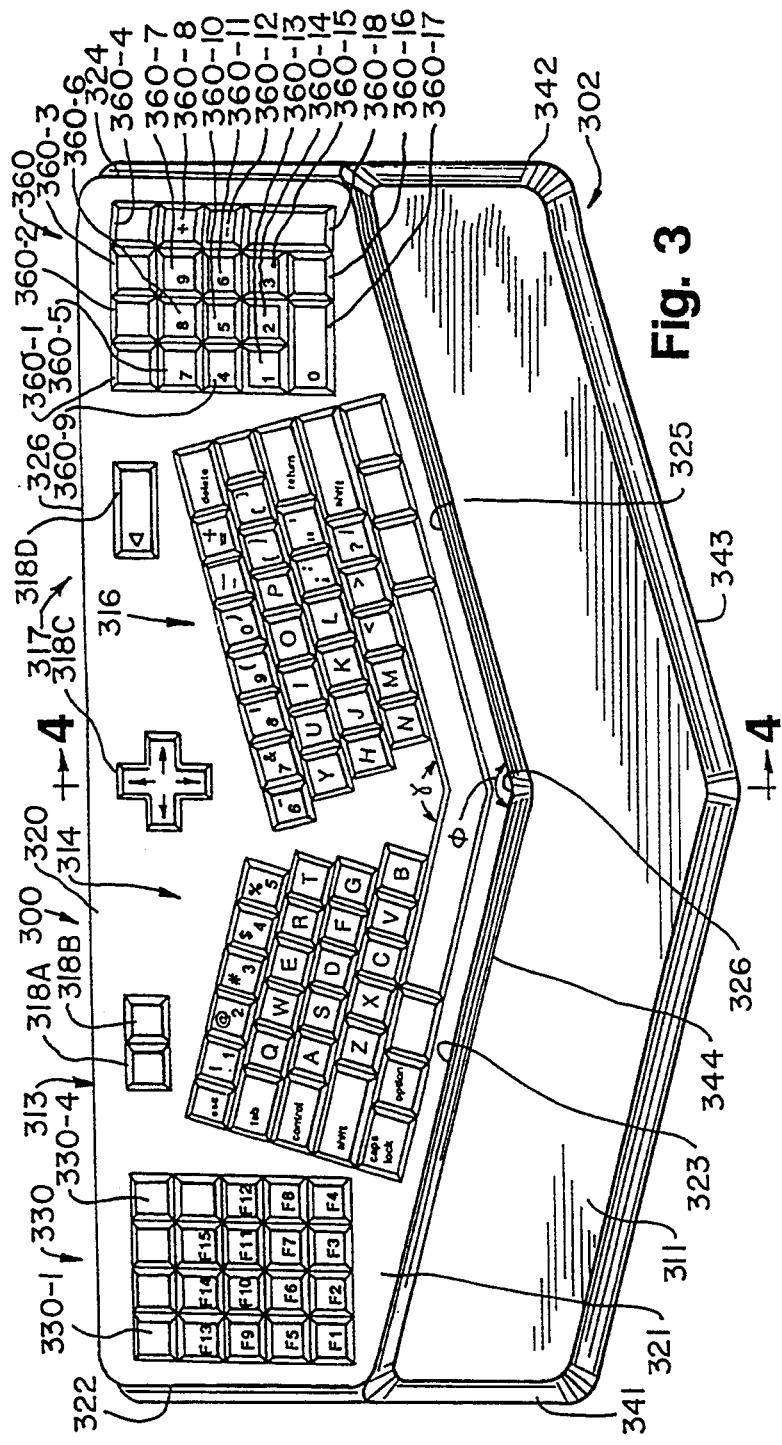
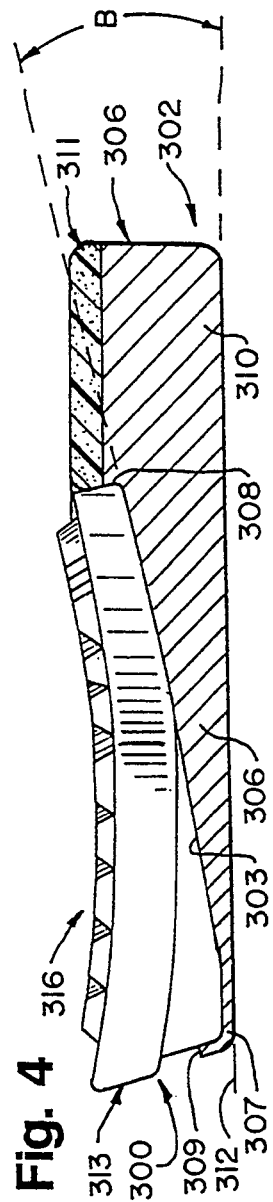

ERGONOMIC KEYBOARD APPARATUS WITH LEFT AND RIGHT KEY SECTION SEPARATED BY AN IRREGULARLY SHAPED SPACE

This is a continuation of application Ser. No. 07/990,021, filed on Dec. 14, 1992, now U.S. Pat. No. 5,302,040; which is a continuation-in-part of application Ser. No. 07/659,604, filed Dec. 21, 1991, now abandoned.

TECHNICAL FIELD

The present invention relates in general to a keyboard apparatus and a method of using it. The invention more particularly relates to keyboard apparatus and method for entering information to reduce or to eliminate repetitive motion injuries to the user.

BACKGROUND

Many improvements have been made in devices and machines for data and word processing. For example, many years ago, the manual typewriter was replaced with the electric typewriter, and the electric typewriter has been nearly replaced with more sophisticated, computer equipment. Yet, notwithstanding the enormous strides that have been made in improving such equipment, the keyboard, which is the basic interface between the machine and the user has remained relatively unchanged. The inconsistency between the vastly improved computer equipment, as compared to the keyboard itself, has been the result of keyboard designers ignoring the physiological structure of the typical user.

More particularly, users, independently of the information being entered via the keyboard, all enter information by manipulating the keyboard in substantially a similar manner. However, the configuration of the conventional keyboard is somewhat incompatible with the physiological structure of the hands, fingers and arms of the user.

This incompatibility causes the hand, finger and wrist movements of the user operator to be somewhat strained, slowed, and even sometimes misdirected, resulting in not only unwanted and undesired physical stress on the operator, but also in undesired fatigue with resulting entry errors. The results of such repetitive stress and errors can cause unwanted loss in time for correcting the errors, as well as a loss in productivity through stress related injuries suffered by the keyboard operator. Such injuries may be severe enough to render the individual unemployable.

With respect to stress injuries, repetitive stroking of an incompatible keyboard is well known to stress the wrists, elbows and shoulders of an operator. Such repetitive stress when continued over long periods of time, can lead to repetitive stress injuries, such as carpal tunnel syndrome, which is a painful and oftentimes a crippling ailment affecting the tendons and nerves in the person's wrist area. It should be understood that carpal tunnel syndrome is only one of several musculoskeletal injuries, frequently being identified variously as cumulative trauma disorder, repetitive strain injury, as well as repetitive motion disorder.

Thus, strained repetitive use of one's hands and fingers can result in swelling causing the tendons to press painfully on the nerves in the person's wrist area. Moreover, if the swelling continues over a protracted period of time, permanent damage to the nerves may result, thereby causing the afflicted person to lose or at least to reduce greatly, his or her ability to grip objects or even the use of their hands. Thus, such injuries not only can cause lost productivity, but also can cause an increase in worker compensation insurance rates, since such insurance is maintained by employers.

In the case where cumulative trauma disorder is caused by the use of a keyboard, the injury may be caused by the inwardly flexing of the wrists to enable the fingers to be positioned properly to reach the keys of the keyboard. Such flexion of the wrists can cause the unwanted, painful pressing of the tendons on the nerves. Through long periods of time of keyboard entry in such an awkward and stressful position, the dreadful malady can result.

Because of the debilitating effect of carpal tunnel syndrome and other such repetitive stress injuries, resulting from keyboard entry for extended periods of time, there has been a long felt need for a keyboard arrangement which would reduce, if not substantially eliminate, such serious physical impairments. Therefore, it would be highly desirable to have a new and improved keyboard arrangement for facilitating keyboard entry in a more relaxed, reduced-stress manner. Such an arrangement should substantially reduce, if not completely eliminate, excessive musculoskeletal fatigue and stress. Such an arrangement should eliminate or at least reduce greatly, cumulative trauma disorder, such as carpal tunnel syndrome and the like.

In view of this long felt need, there have been many attempts to improve and correct the deficiencies of well known keyboard arrangements. For example, reference may be made to the following U.S. Pat. Nos. 4,824,268; 4,669,903; 4,509,873; 4,483,634; 4201,409; 4,081,068; 4,661,005; 4,597,681; 3,929,216; 2,218,519; 1,828,939; 1,687,904; and 1,089,689.

One such attempt at helping to reduce carpal tunnel syndrome is disclosed in U.S. Pat. No. 4,661,005 which shows a pair of keyboards mounted slidably on a stationary bar and separable into two spaced apart areas. Each keyboard is also mounted pivotally to permit a downward pivoting of the keyboards relative to a longitudinal plane.

From the foregoing it appears that it would be difficult, if not impossible, for an operator to pivot each section of the keyboard arrangement downwardly at precisely the same angle; thus, resulting in the wrists of the operator being flexed at different angles. Additionally, separating the keyboards at a sufficient distance to avoid flexure of a user's wrists and hands would substantially disrupt the normal hand to eye coordination facilities of the user which is absolutely necessary for rapid and accurate information entry operations via a keyboard terminal. Moreover, the above-mentioned adjustments would need to be made by each user of the keyboard resulting in reduced productivity as each user would take valuable production time to make his or her own personal adjustments to the keyboard arrangement. Finally, it should also be noted that while the separating and pivoting of the keyboard sections may help relieve a user's discomfort such adjustments may, in fact, be physically improper even though the keyboard placement may feel good to the user. Thus, the separate keyboards are less than satisfactory in substantially reducing cumulative trauma disorder.

Another attempt directed at reducing cumulative trauma disorder is disclosed in U.S. Pat. No. 4,597,681 which discloses an adjustable keyboard arrangement divided laterally into two sections. Each individual section is adjustable about each of two mutually angulated axes so as to change the planes of the sections relative to a support base, and to allow each section to be angularly shifted in its own plane. The keys in each section are also mounted for individual adjustment angularly, laterally and in height.

Thus, in the U.S. Pat. No. 4,597,681, the keyboard construction disclosed therein may lend itself to permitting individual adjustment for more comfortable use, by accommodating the arms, hands and fingers of an operator. However, the patented keyboard arrangement is very expensive to manufacture and awkward to use. In this regard, the axes of angular shift, make it difficult for an operator to visualize clearly each individual character key. Thus, while this keyboard arrangement may tend to help reduce physical stress, it would be a difficult and time consuming process to learn to use this type of keyboard arrangement. In this regard, before a skilled operator can attempt to input information at the same speed as a conventional keyboard, the unique and very different shape and configuration of the patented adjustable keyboard require new skills to be learned. In short, while the adjustable patented keyboard may be designed to overcome some physically disabling problems, a skilled use would require an undesirably long period of training, and may never be able to regain former speed and accuracy. Moreover, as this keyboard arrangement requires individual adjustments, all of the problems noted with respect to the other patents mentioned above would also apply to this keyboard arrangement.

Still yet another attempted solution is a shorthand typewriting machine keyboard disclosed in U.S. Pat. No. 2,318,519 where the keys are divided into two groupings or sections disposed at an angle relative to one another to help orient the hands of an operator in proper alignment with the keys. While this arrangement is ideal for the proper orientation of the hands of a shorthand machine operator, the keyboard construction would not prove satisfactory for use in a modern keyboard, such as the ones used with computers, because the unconventional orientation of the individual keys make it difficult for a skilled keyboard entry person to use efficiently such a keyboard without additional expensive and time consuming training. In this regard, such a shorthand keyboard is, of course, totally different from a computer keyboard.

While each of the above mentioned keyboard arrangements may claim to reduce cumulative trauma disorder, each one would not be satisfactory for use by a highly skilled keyboard entry person. In this regard, many skilled persons earn their living by fast and accurate keyboard entry. Thus, if a keyboard does help in the prevention of repetitive injuries, such a keyboard would not at all be useful to a person who could not use it at a sufficiently high rate of speed to meet employment requirements. Also, long, arduous training is not at all desirable, and can totally preclude its use, even though the prior known keyboards may be useful in preventing injuries. In short, even though a keyboard may prevent injuries, it may not be useful at all, if it can not be operated quickly and easily, with little or no training. With such a keyboard entry method, the entry speed of the operator can be greatly improved over a "hunt and peck" typing technique. However, mastering the touch typing technique, requires many hours of extensive training. While such training is relatively tedious and time consuming, trainees are willing to expend their time and efforts, because at higher entry or typing speeds, the greater the amount of income that can be earned by the operator at a place of employment.

Mastering the touch typing technique is time consuming, because the operator must first memorize the location of each of the keys and their associated control keys. Then, following this memorization, the operator must master complex key stroking patterns by repetitive practice, In order to master touch typing, after the key locations are memorized, specific finger placements must be mastered. In this regard, the fingers of the right and left hands are placed on specific keys of a middle row of characters keys. The fingers of the left hand are positioned on the character keys A, S, D, and F, while the fingers of the right hand are placed on the character keys J, K, L and ;. The fingers of the right and left hands move from these "home or resting positions" to strike the other keys. In this regard, the fingers on the left hand operate the following keys:

|   | 1 | 2 | 3 | 4 | 5 |
|---|---|---|---|---|---|
|   |   |   | CHARACTERS |   |   |
| 1 | 1 | 2 | 3 | 4 | 5 |
| 2 | Q | W | E | R | T |
| 3 | A | S | D | F | G |
| 4 | Z | X | C | V | B |

The fingers on the right hand operate the following keys:

| COLUMNS ROWS | 6 | 7 | 8 | 9 | 10 |
|---|---|---|---|---|---|
|   |   |   | CHARACTER |   |   |
| 1 | 6 | 7 | 8 | 9 | 0 |
| 2 | Y | U | I | O | P |
| 3 | H | J | K | L | ; |
| 4 | N | M | , | . | ? |

The trainee must therefore learn, not only the location of each key, but also must learn the stroking technique for which each key is to be actuated on a finger by finger basis. In order to understand which finger is assigned which key, the finger to key relationship for the left hand is as follows:

| ROWS | LITTLE FINGER (L) | THIRD FINGER (L) | MIDDLE FINGER (L) | INDEX FINGER (L) |
|---|---|---|---|---|
| 1 | 1 | 2 | 3 | 4, 5 |
| 2 | Q | W | E | R, T |
| 3 | A | S | D | F, G |
| 4 | Z | X | C | V, B |

The finger to key relationship for the right hand is as follows:

| ROWS | INDEX FINGER (R) | MIDDLE FINGER (R) | THIRD FINGER (R) | LITTLE FINGER (R) |
|---|---|---|---|---|
| 1 | 6, 7 | 8 | 9 | 0 |
| 2 | Y, U | I | O | P |
| 3 | H, J | K | L | ; |
| 4 | N, M | , | . | ? |

Based on the foregoing, it is apparent that the individual fingers of a user start on different home keys and then travel quickly and instinctively to a plurality of different positions. For example, the index finger of each hand must travel from a rest position to seven different keys. Training the fingers to move from the home keys to the target keys, and then back again, requires practice repeatedly, until the fingers move instinctively from key to key in an extremely rapid and accurate manner.

Thus, the touch typing technique requires trainees to learn the complex stroking patterns associated with moving their fingers across the keyboard in a rapid accurate manner, until an acceptable level of entry speed can be achieved with few or no errors in an instinctive manner. Unfortunately, because of musculoskeletal physical stress on the fingers, hands, waists, arms, neck, shoulders and back of the person executing the strokes, entry speed is generally limited to no more than three to five strokes a second, even after lengthy training.

Like riding a bicycle, once a person learns the complex keystroke patterns of touch typing, the patterns remain fixed in the reflex memory of the typist. Such a trained person can easily repeat the rapid fire finger movements in an instinctive manner, even after extended periods of not using the technique. In this regard, it should be recognized that since the fingers of a user are trained to move in unique patterns, the slightest deviation from that pattern of key strokes, will seriously degrade the training of the keyboard operator so that he or she may never be able to attain the same high rate of entry speed using conventional touch typing key strokes.

Therefore, it is absolutely clear that anyone who has mastered the art of touch typing, would have an extremely difficult, if not impossible time, in attempting to do keyboard entry on any one of the prior known stress-relieving keyboards, such as the aforementioned patented keyboards. In this regard, when positioning the fingers on the unfamiliar, distinctive prior known keyboards, the fingers would be unable to perform instinctively as previously trained, due to the different spatial arrangement of keys. Thus, the familiar ingrained training must be unlearned, and a whole new key stroke pattern would be required. Such an arduous and time consuming training process is unwanted and undesirable. Also, it may be completely impossible for a person to achieve his or her previous finger speed and accuracy.

Thus, if a person is unable to do keyboard entry at a sufficiently high rate of speed with acceptable accuracy, then the livelihood of such a person may be at risk. The employer normally demands a certain level of proficiency, before a keyboard entry person will be hired. Also, from the perspective of an employer, a keyboard will not be used if it slows down the operator to a point where productivity is not satisfactory. Thus, even if a keyboard may somehow reduce physical stress on the operator, it will not at all be useful or acceptable if the speed and accuracy of the operator is severely impaired.

Therefore, it would be highly desirable to have a new and improved keyboard arrangement that permits a user/operator to enter information rapidly and conveniently in an extremely fast and accurate manner. In this regard, the user/operator should be able to enter information as rapidly as when using a conventional keyboard arrangement, and should not be required to undergo extensive and time consuming training in order to use the keyboard arrangement in a rapid data entry manner.

An early design of a mechanical typewriter keyboard is disclosed in U.S. Pat. No. 1,138,474. In this patent, there is recognition of the stressful position that must be assumed by the forearms, wrists and hands of a keyboard operator. The patent therefore disclosed a keyboard that has separated groups of keys in an attempt to preclude the hands of the user being twisted. While a keyboard having this type arrangement would result in less strain upon the abducent muscles, it is also apparent that such a keyboard arrangement could not be used by a modern day word processing or data entry person in a rapid and efficient manner. In short, one could certainly not use familiar touch typing techniques on such a typewriter. In this regard, a data entry person has years of training so that finger to keypad movements are accomplished instinctively and accurately. Thus, if the fingers of the user are positioned in the usual four finger groupings as is well known in the touch typing technique, it is apparent numerous errors would occur. More particularly, as the fingers move from their rest position to designated target keys, the target key would be misplaced and thus, the key would either be completely missed, struck simultaneously with another key, or hit other than at its center pad location. Thus, in order for a skilled person to use such an arrangement, they would necessarily need to learn a substantially different typing technique with numerous modifications to the conventional finger to key stroking maneuvers executed according to conventional touch type techniques.

BRIEF SUMMARY OF INVENTION

Therefore the principal object of the present invention is to provide a new and improved keyboard arrangement and method of using it, to not only relieve unwanted physical stress, but also to enable a skilled user to do keyboard entry at a high rate of speed with an acceptable degree of accuracy.

Another object of the present invention is to provide such a new and improved keyboard arrangement and method of using it, so as to enable a touch typist to learn to use such a keyboard arrangement and method, with little or no training. Still another object of the present invention is to provide such a new and improved keyboard arrangement that is relatively inexpensive to manufacture.

Briefly the above and other objects and features of the present invention are provided in a new and improved keyboard apparatus having two spaced apart clusters or groups of character keys. Each cluster or group is configured in an elongated rectangularly shaped arrangement. The clusters or groups are angularly displaced between their transverse dimensions by an angle $\theta$ of about 31° to about 36°. Each group of character keys is arranged in a series of spaced apart staggered rows of discrete character keys and includes a common V-shaped space bar key bridging the two clusters. In order to facilitate easy recognition of the function of each of the character keys, character indicia is disposed on the top surface of selected ones of the keys and is angularly displaced thereon by an angle of about $\theta/2$.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 3 is a top plan view of another keyboard apparatus, which is also constructed in accordance with the present invention shown with a keyboard cradle also being constructed according to the present invention;

FIG. 4 is a sectional view of the keyboard apparatus and keyboard cradle unit of FIG. 3 taken substantially on lines 4—4 thereof;

DISCLOSURE OF INVENTION

Figure 1:
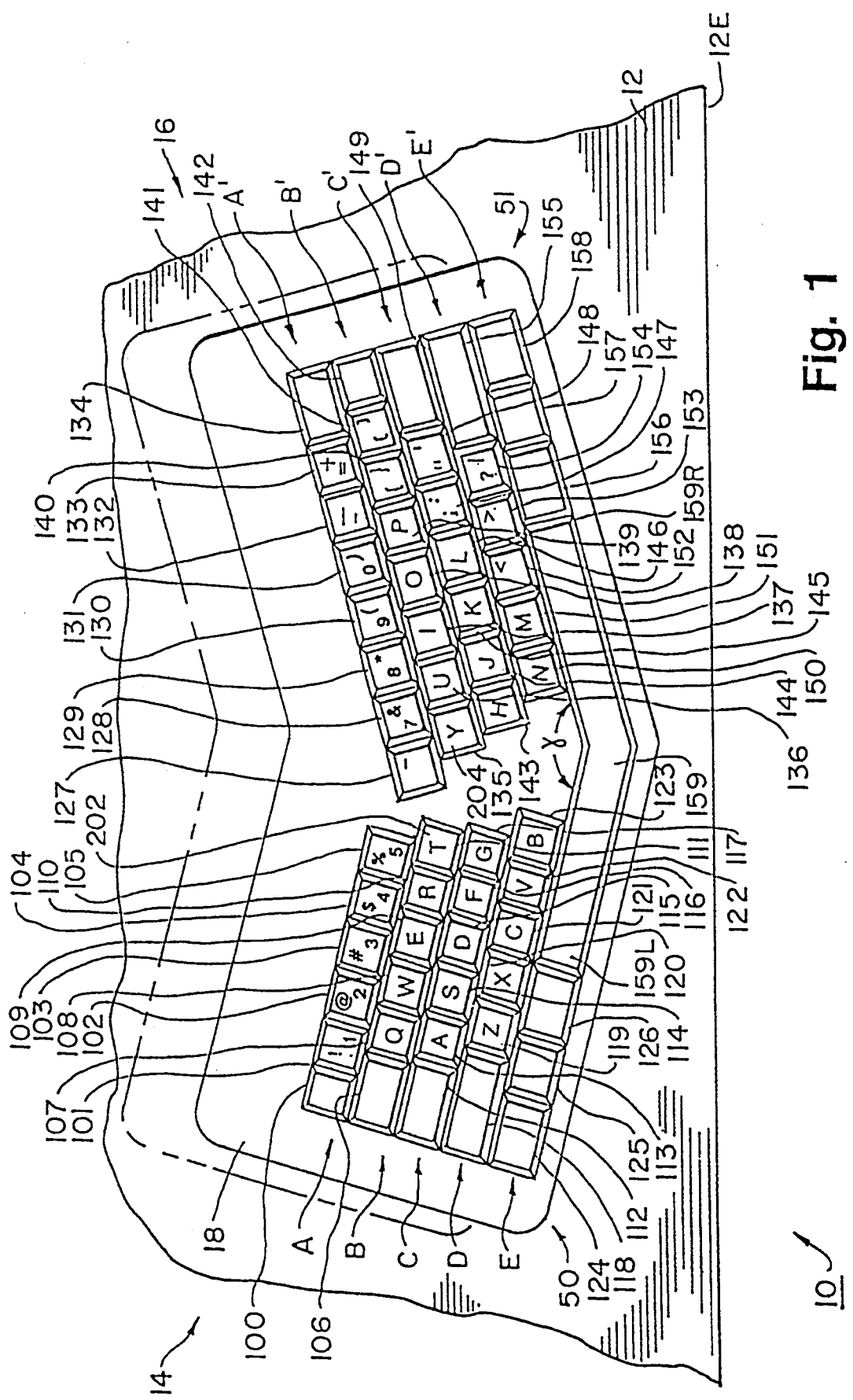
FIG. 1 is a top plan view of a keyboard apparatus which is constructed in accordance with the present invention, showing in phantom line the keyboard apparatus disposed at a different location on the supporting surface.
Figure 2:
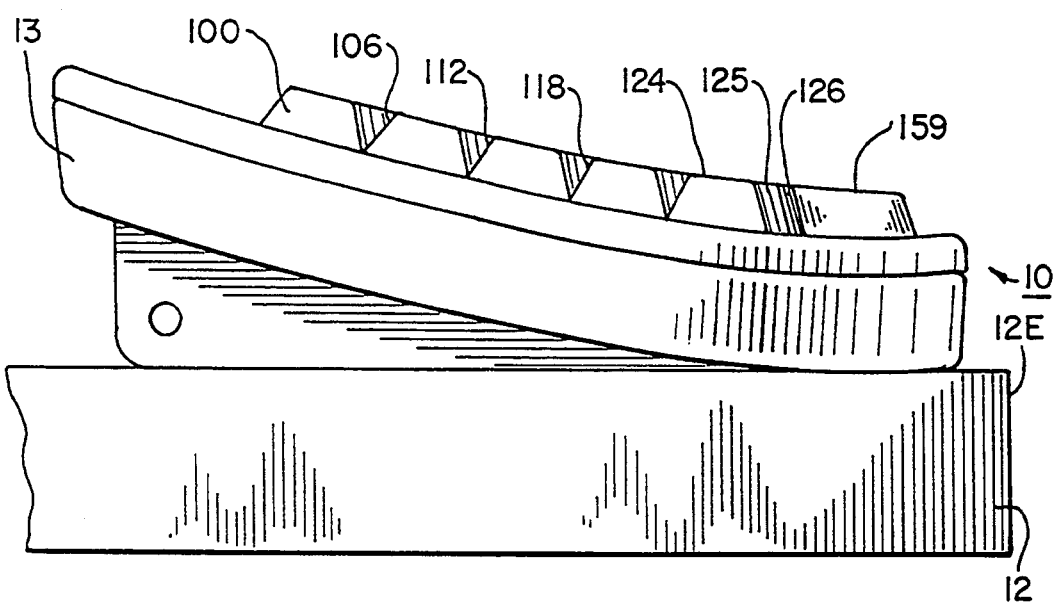
FIG. 2 is an enlarged side elevational view of the keyboard apparatus of FIG. 1.

Referring now to the drawings, and more particularly to FIGS. 1 and 2 thereof, there is shown an ergonomic keyboard apparatus 10, which is constructed in accordance with the present invention and which is illustrated positioned on a stationary surface, such as a work station surface 12.

The keyboard apparatus 10 generally comprises a housing unit 13 (FIG. 2) which is adapted for positioning on the surface 12. The keyboard apparatus 10 also includes a set of character keys projecting upwardly from a face plate 18.

Figure 5:
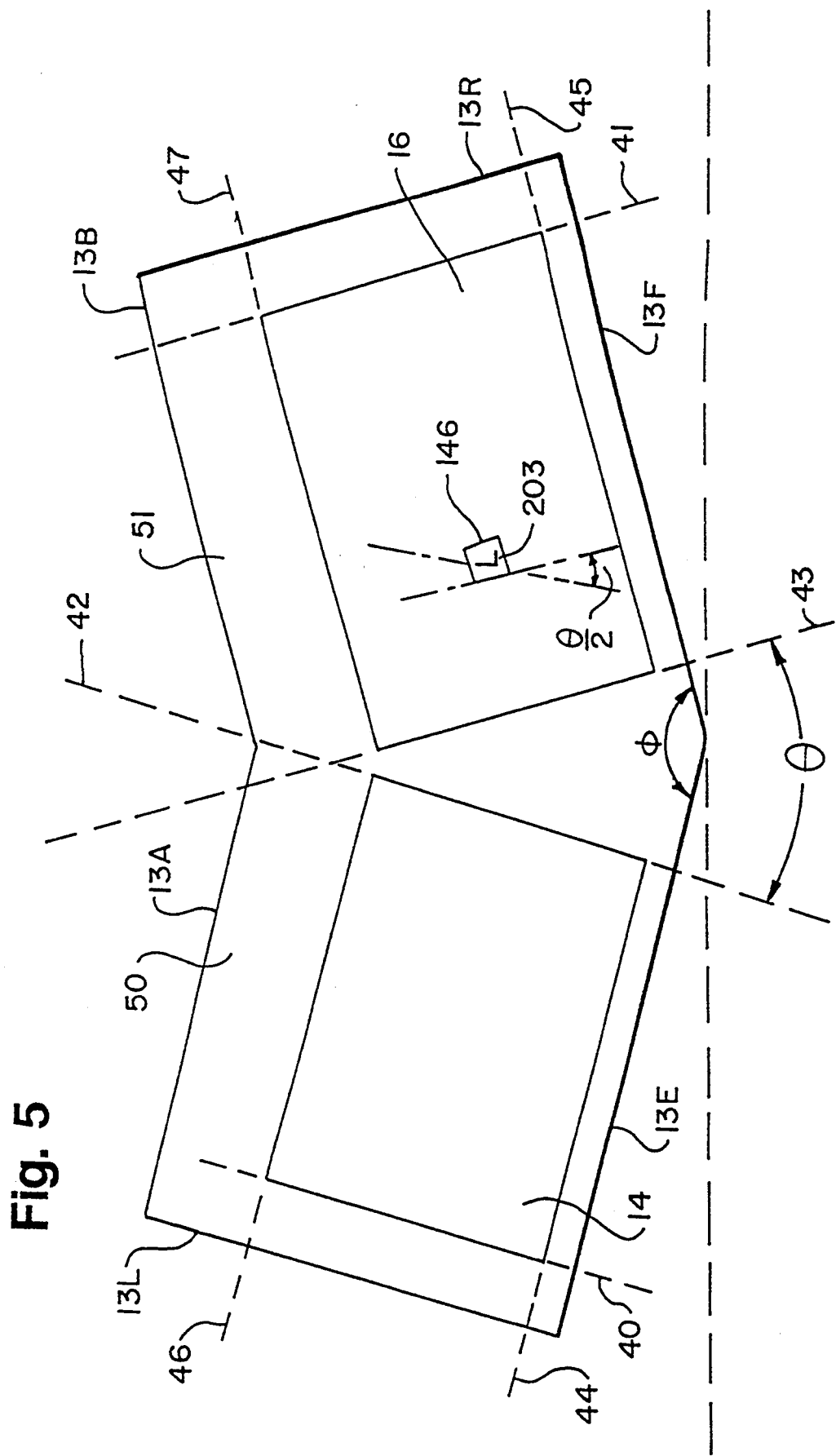
FIG. 5 is a diagrammatic view of the keyboard apparatus of FIG. 1 showing the angular relationship between individual character keys and character key groupings.

The character keys are arranged in a pair of spaced apart character key groupings 14 and 16 where each grouping includes a large number of single discrete keys for producing and controlling the entry of alphanumeric characters into a computer or other such equipment (not shown). As will be explained hereinafter in greater detail, the two groupings 14 and 16 are disposed at an angle $\theta$ relative to one another, as indicated in FIG. 5, to relieve physical stress of the user.

As best seen in FIGS. 1 and 2, the key groupings 14 and 16 are coplanar and completely spaced apart by a space 15 having an irregular pentagular shape. The shape of the space 15 is so arranged to help an experienced touch typist utilize the keyboard apparatus 10 with substantially the same touch typing keystroke techniques as he or she would use on a conventional QWERTY type keyboard arrangement.

Considering now the operation of the keyboard apparatus 10 in greater detail, a user operates the apparatus 10 by the familiar touch typing technique, and thus can perform data and character entry operations in a fast and accurate manner. In this regard, the character keys in the left grouping 14 of keys are arranged to facilitate familiar touch typing techniques for the left hand. Similarly the keys of the right grouping 16 are arranged to facilitate touch typing techniques for the right hand. Because the character keys are arranged according to a key group to finger type arrangement, there is no need for a user to make keystrokes from one grouping of character keys to the other grouping of character keys.

In operation, a user commences using the keyboard apparatus 10 by placing his or her fingers in a manner similar to familiar touch typing techniques. The user then adjusts the keyboard housing/mount 13 a sufficient distance from the edge of the work station 12 so that his or her wrists and hands are maintained in a straight and aligned relationship to one another to orient the keyboard in a position for comfortable and physiologically safe operation by the user. The user then presses the character keys in seriatim. In this regard, whenever the user depresses one of the character keys, an electrical signal is generated by the keyboard electronics (not shown) which is indicative of a character code that is based on the American Standard Code for Information Interchange (ASCII). ASCII codes are well known to those skilled in the art and consist of 7-bit coded characters used for information exchange between data processing systems, data communication systems and associated equipment. More particularly, the ASCII set consists of control characters and alphanumeric characters for producing a written language.

Although in the preferred form of the present invention the depression of the individual character keys produces an ASCII code, it will be understood by those skilled in the art that other codes or other means, such as mechanical linkages as used in mechanical typewriters could be utilized for causing a written language to be produced in response to a user depressing the character keys in seriatim.

Considering now the housing 13 in greater detail with reference to FIGS. 1 and 5, the housing 13 in generally V shaped, and includes a generally rectangular or elongated shaped left section 50, and a generally rectangular or elongated shaped right section 51. The character keys in the left section 50 are disposed at an angle $\theta$ relative the right section 51, where the angle $\theta$ is between the transverse dimensions of the two groupings 14 and 16. The angle $\theta$ is at about 26° to 36°. A more preferred angle $\theta$ is at about 31° to 36°; and the most preferred angle $\theta$ is about 31°. The angle $\theta$ between the groupings 14 and 16 enable the hands and wrists of the user to be aligned coextensively thus reducing, if not substantially eliminating physical stress on the hands, wrists, arms, shoulders and back muscles of the user.

As best seen in FIG. 5, the left grouping 14 generally comprises a set of character keys 100-126 (FIG. 1) that are mounted substantially within an area of the housing 13 defined by a left side transverse line 40 disposed parallel and spaced apart from the left edge 13L portion of the housing 13, a right side transverse line 42 disposed parallel and spaced apart from the line 40 and a pair of parallel spaced apart longitudinal line 44, 46 extending perpendicularly between the lines 40 and 42 respectively.

In a similar manner, the right grouping 16 generally comprises a set of characters keys 127-158 that are mounted substantially within an area of the housing 13 defined by a right side transverse line 41 disposed parallel and spaced apart from the right edge 13R portion of the housing 13, a left side transverse line 43 disposed parallel and spaced apart from the line 41, and a pair of parallel spaced apart longitudinal lines 45 and 47 extending perpendicularly between the lines 41 and 43.

As best seen in FIGS. 1 and 5, the longitudinal lines 46 and 47 terminate at the transverse lines 42 and 43 respectively and are spaced apart from their terminal ends by about one-half the width of a character key, such as the character key 146. In this regard, character key 146 is a standard width character key utilized for conventional QWERTY type square keys and is generally about three-fourths inches in width and three-fourths inches in length. From the foregoing it should be understood that lines 46 and 47 are spaced apart by about three-eighths of an inch.

As best illustrated in FIG. 5, the right side transverse line 42 and the left side transverse line 43 converge together to form the angle $\theta$.

As best seen in FIG. 5, selected ones of the character keys include character indicia, such as a character indicia 146 and 203 to help facilitate easy recognition of the individual character keys. The character indica, such as indicia 146 is angularly disposed along the transverse dimension of the grouping rotated by a sufficient angle $\theta/2$ to facilitate easy recognition of the character indica. Thus, a user may quickly and easily place his or her fingers on the familiar keys utilized in touch typing techniques.

Considering now the left grouping 14 of the character keys 100-126 in greater detail, the character keys 100-123 are generally rectangular in shape and are arranged in four staggered rows A-D with a fifth row E dedicated to selected function/control keys 124-126. A chevron-shaped space bar key 159 is disposed intermediate the left grouping 14 and the right grouping 16. The configuration or arrangement of the keys 100-123 are substantially similar to part of a conventional QWERTY keyboard layout as will be explained hereinafter in greater detail.

The character keys 100, 106, 112, 118 and 124 are aligned along their left side edges in a transverse column along line 40 (FIG. 5). Character key 100 is substantially similar in size and shape as keys 101-105, where keys 100-105 are distinguishable from one another by character indicia, disposed on the top surface of each key such as a character indicia 202 disposed on key 112.

As best seen in FIG. 1, character key 106 is approximately 20% wider than character key 100, character key 112 is approximately 50% wider than character key 100, and character key 118 is approximately twice the width of character key 106. Due to the increasing size difference between character keys 100, 106, 112, and 118, the character rows A, B, C and D are staggered from one another.

In order to permit a user to easily and conveniently read the character indicia disposed on each key, such as indicia 202, the indicia disposed on the top surface of each of the character keys is canted or skewed at an angle $\theta/2$ along the transverse dimension of the grouping 14. In this regard, the character indicia is disposed in more familiar touch typing orientation to facilitate easy recognition by a user of the keyboard. It should be understood that such canting or skewing is made possible by the rectangular shape of the individual keys. Stated otherwise, if the keys were circular in shape, it would not be possible to cant or skew the indicia in relationship to the keys.

The character keys 100-126 also contain character indicia including function indicia that corresponds to the characters produced by a user manipulating the left hand digits in a familiar touch typing technique.

Considering now the right grouping 16 of the character keys 127-158 in greater detail, the character keys 127-158 are arranged in four straight longitudinal rows A' to D' with a fifth row E' dedicated to selected function/control keys 155 to 158. The rows A' to E' correspond to rows A to E in the left grouping 14. The character keys in grouping 16 are arranged in staggered rows and columns to enable a user to employ standard QWERTY keyboard touch typing keystrokes without the need of learning new key positions. In this regard, an experienced touch typist is able to maintain his or her typing speed. Rows A to D of the left grouping 14 of character keys 100-123 and rows A' to D' of the right grouping 16 of character keys 127-154 form a plurality of broken V-shaped rows; and row E of the left grouping 14 of selected function/control keys 124-126 and row E' of the right grouping 16 of selected function/control keys 155-158 in combination with the chevron-shaped space bar key 159 form an unbroken V-shaped row.

The character keys 134, 142, 149, 155 and 158 are aligned along their right side edges in a transverse column along phantom line 41 (FIG. 5). The character keys in grouping 16 are also arranged in columns, with staggered rows. In this preferred form of the present invention, the character keys 127-158 include the character indicia including function indicia corresponding to the characters produced by the manipulation of the right hand digits of the user during touch typing techniques.

In order to permit a user to easily and conveniently read the character indicia disposed on the top surface of the character keys in the right grouping 16 the character indicia thereon, such as indicia 204 is canted by an angle $\theta/2$ along the transverse dimension of the grouping 16. Such canting or skewing is described in greater detail with reference to grouping 14.

Although in the preferred form of the present invention, the numeric key 127 is shown in the right grouping 16, it is contemplated within the scope of the present invention that key 127 may be placed in row A adjacent to key 105. While this positioning of the key 130 in row A would result in a finger to grouping incongruity, one skilled in the art would understand that a person skilled in touch typing techniques would need only to learn one modified keystroke relative to standard touch typing techniques. Instead of reaching the index finger of the right hand to a numeric key such as the key 128 that is immediately adjacent to a numeric key 127, the typist would need to extend his or her finger stretch with the right index finger for a numeric key adjacent to key 105 that is only a slightly further distance. In this regard, because the repositioned numeric key would be so closely positioned relative to the key 128, the modified stroking motion would be substantially the same as used in familiar touch typing techniques. Thus, a skilled operator could easily master the keyboard apparatus 10 and secure the same or greater data entry speed with fewer errors due to relative positions of the grouping 12 and 14 which help aligning the hand and wrist disposed on each respective arm of a user.

Considering now the space bar key 159 in greater detail, the space bar 159 is generally V- or chevron-shaped and extends between or bridges the two key grouping 14 and 16. The space bar key 159 includes a left leg portion 159L and a right leg portion 159R. The left leg portion 159L and the right leg portion 159R are integrally joined together at a apex having an angle $\gamma$. The angle $\gamma$ is about five times the angle $\theta$. In this regard, the angle $\gamma$ is between about 154° and about 144°. A more preferred angle $\gamma$ is between about 149° and about 144°; and a most preferred angle γ is about 149°. The left leg portion 159L is directly below and adjacent to keys 121 to 123, while the right leg portion 159R is directly below and adjacent to keys 150 to 152. In the preferred embodiment of the present invention, key 159 function as a conventional single space bar key. In this regard, although only a single space bar is shown in the preferred embodiment, it should be understood by one skilled in the art that the space bar key 159 could be divided into two separate keys, one associated with the left grouping 14 and the other associated with the right grouping 16.

Considering now the operation of the keyboard apparatus 10 in still greater detail, a skilled touch typist user (not shown) positions his or her hands in a normal touch typing position relative to the keyboard apparatus 10 for the purpose of entering character data. In this regard, the user positions his or her left hand in co-extending alignment with his or her left wrist and forearm allowing the forearm to rest on the support surface 12. Depending on the weight of the user or the length of the users arms, the user adjusts the position of the keyboard apparatus 10 on the stationary surface 12 so that the fingers of the user rest comfortably on the normal starting position keys for a touch typist.

Once the user has adjusted the keyboard placement, the finger to key placement is made by the user so that the wrists of the user stay in co-extended alignment with the hands of the user relative to the starting position. Should the user require additional support for his or her arms and wrist, the user may position a supporting pad, not shown on the supporting surface 12 under the wrist and forearms of the user. Once the user has properly positioned his or her arms, wrists, hands and fingers, conventional touch typing strokes may be executed for producing written textual material.

Considering now row A of the left side grouping 14 in greater detail with reference to FIG. 1, row A consists of six (6) keys 100–105 which are equally spaced apart. Row A is disposed in a parallel spaced apart manner adjacent to a left top edge 13A (FIG. 5) of the housing unit 13. Each of the keys 100–105 in row A are substantially identical in size and shape and are distinguished from one another by the indicia which is disposed on the top surface of each key.

Key 100 has its left most edge aligned along the phantom line, shown as line 40 (FIG. 5) which defines the left peripheral edge of the grouping 14. In this regard, the left most edge of keys 100, 106, 112, 118 and 124 are aligned against this phantom line 40.

Considering now row B of the left grouping 14 in greater detail with reference to FIG. 1, row B consist of six keys 106–111. Keys 106–111 are equally spaced apart from one another and are substantially identical in size and shape except for key 106. Key 106 is approximately the width of 1½ of the other standard size keys in row A and functions as a control key. Each of the keys 107–111 are distinguished one from another by the indicia which is disposed on the top surface of each key. Key 106 is disposed below keys 100 and 101 causing keys 107 to 111 to be staggered or shifted slightly to the right of keys 101 to 105. In this regard, the relationship between keys 101 to 105 and keys 107 to 111 enables familiar touch typing techniques to be used.

Considering now row C of the left grouping 14 in greater detail with reference to FIG. 1, row C consists of six keys 112 to 117. Keys 113 to 117 are spaced apart from one another and are substantially identical in size and shape. Key 112 is slightly larger than key 106 causing the keys 113 to 117 to be shifted or staggered slightly to the right of keys 107 to 111. Keys 113 to 117 are distinguishable from one another by the indicia which it disposed on the top surface of each key.

Considering now row D of the left side group 14 in greater detail with reference to FIG. 1, row D consists of six keys, 118–123 which are equally spaced apart. Keys 119 through 123 are substantially identical in size and shape and are distinguishable from one another by the indicia which is disposed on the top surface of each key. Key 118 is approximately twice the width of the other keys in row D. Key 123 has its right most edge aligned substantially along the phantom line 42, which defines the right peripheral edge of the grouping 14 as shown in FIG. 5.

Considering now row E of the left grouping 14 in greater detail with reference to FIG. 1, row E consists of three keys 124 to 126. Keys 124 and 126 are substantially identical in size and shape and key 125 is substantially similar in size and shape to key 100. Each of the keys 125 and 127 is distinguishable from one another by the indicia which is disposed on the top surface of each key.

Considering now the right side grouping 16 of the character keys in greater detail with reference to FIG. 1, the right side grouping 16 consists of 32 character keys 127–158 which are arranged in five spaced apart horizonal rows A' to E'. The configuration or arrangement of the keys 127 to 158 are substantially similar to part of a conventional QWERTY keyboard layout as will be explained hereinafter in greater detail. In this regard, the staggered rows and columns enable the user to employ standard QWERTY keyboard touch typing keystrokes without the need of learning new key positions. This arrangement helps a keyboardist maintain his or her touch typing speed with reduced stress. Thus, such an arrangement helps to facilitate greater typing efficiencies and more particularly typing speeds.

Considering now row A' of the right side grouping 16 in greater detail with reference to FIG. 1, row A' consists of eight (8) keys 127 to 134 which are equally spaced apart. Row A' is disposed in a parallel spaced apart manner adjacent to a top right edge 13B of the housing unit 13. Each of the keys 127–134 in row A' are substantially identical in size and shape with the exception of key 134. Keys 127 to 133 are distinguished from one another by the indicia which is disposed on the top surface of each key. Key 134 which is disposed at the right end of row A' and adjacent to key 133, is approximately one and one half the width of any of the other keys in row A', such as key 133 and substantially the same height. Key 134 has its upper most edge aligned along the phantom line shown as line 47 which defines the top peripheral edge of grouping 16. Key 134 has its right edge aligned along the phantom line 41. In this regard the right edge of keys 134, 142, 149, 155 and 158 are all aligned against the phantom line 41.

Considering now row B' of the right side grouping 16 in greater detail to FIG. 1, row B' consists of eight keys 135 to 142 which are equally spaced apart. Keys 135 to 142 are substantially identical in size and shape. Each of the keys 135 to 142 are distinguishable one from another by the character indicia which is disposed on the top surface of each key. As key 134 is approximately one and one half times wider than any one of the keep in row A', the character keep 135–142 in row B' are staggered to the right of the character keys 127–133 in row A'.

Considering now row C' of the grouping 16 in greater detail with reference to FIG. 1, row C' consists of seven keys 143 to 148 and key 149. Keys 143 to 148 are equally spaced apart and are substantially identical in size and shape and are distinguishable from one another by the indicia which is disposed on the top surface of each key. The key 149 is approximately the width of two of the character keys in row B'. In this regard, the keys 143–148 in row C' are shifted or staggered to the right of keys 135–140 in row B'.

Considering now row D' of the right side grouping 16 in greater detail with reference to FIG. 1, row D' consists of six keys 150 to 155 which are equally spaced apart. Keys 150 to 154 are substantially identical in size and shape and are distinguishable from one another by indicia which is disposed on the top surface of each key. Key 155 is elongated in shape and is slightly wider than key 149. In this regard, the keys 150–154 in row D' are shifted or stagger slightly to the right of keys 143–147 in Row C'.

Considering now row E' of the right grouping 16 in greater detail with reference to FIG. 1, row E' consists of three keys 156 to 158. Keys 156 to 158 are equally spaced apart, and are substantially identical in size and shape. The keys 156 to 158 are distinguishable from one another by indicia which is disposed on the top surface of each key.

As best seen in FIG. 5, the housing 13 includes a left front edge portion 13E and a right front edge portion 13F. The left front edge portion 13E and the right front edge portion 13F converge together at an apex defined by an angle $\phi$, where the angle $\phi$ is substantial identical to the angle $\gamma$.

Referring now to the drawings, and more particularly to FIGS. 3 and 4, there is shown another keyboard apparatus 300 which is constructed in accordance with the present invention and which is shown in operative position with a support unit 302 for helping to support the keyboard apparatus 300 as well as the wrists and arms of a user (not shown). The support unit 302 is also constructed according to the present invention.

Considering now the keyboard apparatus 300 in greater detail with reference to FIGS. 3 and 4, the apparatus 300 generally comprises a housing 313 which is adapted to be positioned on a generally flat stationary surface such as a surface 312. The apparatus 300 includes a pair of angularly disposed, generally rectangular groupings of character keys shown generally at 317, disposed intermediate a pair of left and right numerical keyboard pads 330 and 360 respectively. The grouping 317 is generally V-shaped and includes, a left side grouping and a right side grouping, shown generally at 314 and 316 respectively. The groupings 314 and 316 are configured and arranged in a similar manner to the groupings 14 and 16 of the keyboard apparatus 10 as shown in FIG. 1, and will not be further described. The apparatus 300 also includes a row of dedicated key 318A, 318B, 318C and 318D for causing dedicated functions codes to be produced, such as cursor movement functions as controlled by the cross-shaped key 318C.

In operation, the keyboard apparatus 300 operates in a similar manner to the apparatus 10 as herein before described. Apparatus 300 includes the pads 330 and 360 which each include a group of special function keys such as key 330-1 and numeric keys, such as numeric key 360-1 respectively. In this regard, whenever a user depresses one of the special function keys, such as special function key 330-1, an electrical signal is generated by the keyboard electronics (not shown), which signal is indicative of a character code based on the ASCII codes.

Considering now the housing 313 in greater detail with reference to FIG. 3, the housing 313 is generally pentagonally shaped, and generally comprises a rear rectangularly shaped portion 320 and a triangularly shaped portion 321 to form a pentagonally shaped top surface. The key pads 330 and 360 are disposed at portion 320, while the grouping 317 is disposed partially in portion 320 and partially in portion 321.

As best seen in FIG. 3, the rectangular portion 320 includes a left end edge 322 and a right end edge 324. The portion 320 also includes a V-shaped front edge 326 extending between the left edge 322 and the right edge 324.

The portion 326 includes a pair of front edges 323 and 325 extending from end edge 322 and 324 respectively, and converge at an apex. The edges 323 and 325 are disposed at an angle $\phi$. The angle $\phi$ is between about 154° and about 144°. A more preferred angle $\phi$ is between about 149° and about 144°. A most preferred angle $\phi$ is about 149°.

Considering now the keyboard pad 330 in greater detail with reference to FIG. 3, the keyboard pad 330 is a functional keyboard pad and is configured in a generally rectangular shape. The pad 330 comprises a group of 20 function keys, such as keys 330-1 and 330-4. The keys of the pad 330 are all substantially identical in size and shape, and are distinguishable from one another by character indicia disposed on the top surface of the keys.

The keys of the pad 330 are arranged in five straight longitudinal rows, and four transverse columns to define a five key by four key matrix.

Considering now the pad 360 in greater detail with reference to FIG. 3, the pad 360 is a numeric keyboard pad and is configured in a generally rectangular shape. The pad 360 includes a group of 18 substantially identical keys 360-1 to 360-16 and two larger keys 360-17 and 360-18 respectively. Keys 360-17 and 360-18 are substantially identical in size and shape, and are disposed at right angles relative to one another. Keys 360-1 to 360-16 are distinguishable from one another also by indicia disposed on the top surface of each respective key. The numeric keyboard pad 360 is arranged in five straight rows, and four columns.

Considering now the cradle 302 in greater detail with reference to FIGS. 3 and 4, the cradle 302 includes a wedged shaped base 306 having a rear upwardly projecting wall or lip 307 terminating in an edge 309, for confining the keyboard 300 on its upper sloping surface 303 of the cradle 302.

The base 306, is generally rectangular in configuration sloping upwardly from the rear wall 307 toward a user terminating in a stop portion or internal shoulder 308, canted rearwardly at an angle that is substantially parallel with the upwardly projecting wall 307. The stop 308 cooperates with the wall 307 and surface 303 to define a receiving area or well, for the keyboard 300. In this regard, when the keyboard 300 is placed in the receiving area between the wall 307 and the stop 308, the top surface of the keyboard is caused to be supported from below on the base 306, in a plane disposed at an angle $\beta$ relative to the plane of the surface 312 supporting the cradle 302. The angle $\beta$ is about 0° to 10°. A more preferred angle β is between about 5° to about 10°; and a most preferred angle is about 10°.

As best seen in FIG. 4, the cradle 302 enables the keyboard 300 to rest therein, with the keys being disposed in a generally downwardly inclined position, from front to rear. In such a position, the hands extend downwardly over the keyboard in a generally unstressed manner. Thus, the cradle helps to prevent repetitive stress injuries. The angle β achieves this result. Moreover, for the same purpose, the cradle 302 enables the user to rest the hands and wrists thereon during keyboard entry.

The cradle 302 also includes a front enlarged block portion 310 integrally connected to base portion 306, for providing a resting surface for the wrists and hands of a user. The base and block portions 306 and 310 are composed of a suitable material that may be easily molded into the general shape of the cradle. Such materials include styrofoam, and other suitable thermoplastic materials, such as polyurethane.

In order to provide the user with a relatively soft surface upon which to rest his or her wrists and hands, the cradle 302 also includes a padded V-shaped portion 311. The padded portion 311 is a flat sheet and has a pair of spaced apart parallel end walls 341 and 342 (FIG. 3). The padded portion 310 also includes a pair of spaced apart parallel V-shaped front and rear edges 343 and 344 where the rear edge 344 is conformed to a shape complementary to the front edge of the keyboard housing 313.

Figure 6:
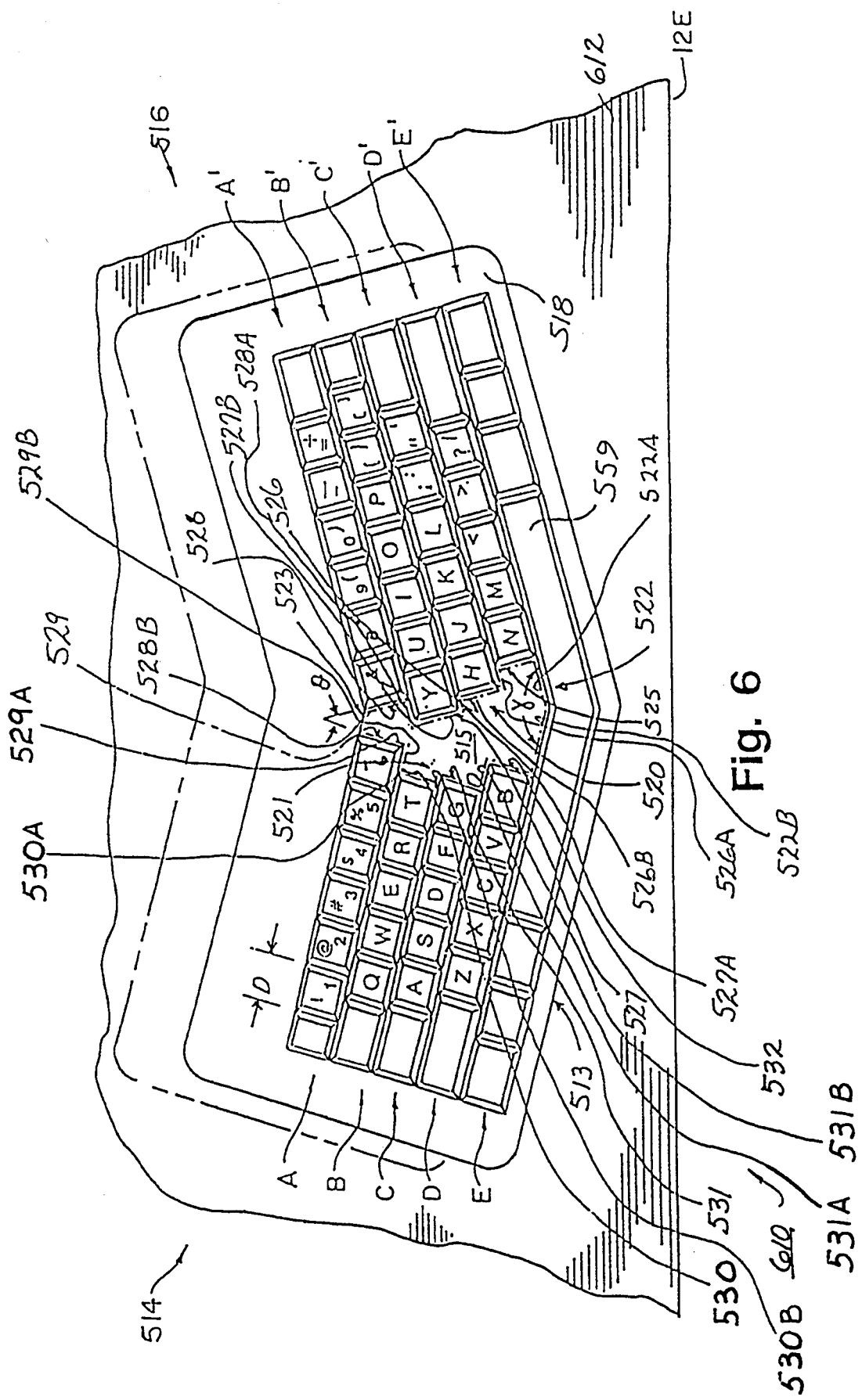
FIG. 6 is a top plan view of a keyboard apparatus which is constructed in accordance with the present invention, showing in phantom line the keyboard apparatus disposed at a different location on the supporting device.

Referring now to the drawings, and more particularly to FIG. 6 thereof, there is shown an ergonomic keyboard apparatus 610, which is constructed in accordance to the present invention and which is illustrated positioned on a stationary surface; such as a work station surface 612. The keyboard apparatus 610 is substantially the same as keyboard apparatus 10 except that the numeric key for the number six is disposed adjacent to the numeric key for the number five.

The keyboard apparatus 610 generally comprises a housing unit 513 which is adapted for positioning on the surface 612. The keyboard apparatus 610 also includes a set of character keys projecting upwardly from a face plate 518.

The character keys are arranged in spaced apart key groupings 514 and 516 where each grouping includes a large set of discrete character keys for producing and controlling the entry of alphanumeric characters into a computer or other such equipment (not shown). As will be explained hereinafter in greater detail, the two groupings 514 and 516 are disposed at an angle θ relative to one another, as indicated in FIG. 10 to relieve physical stress of the user.

As best seen in FIG. 6, the key groupings 514 and 516 are coplanar and completely spaced apart by a space 515 having an irregular shape as will be described hereinafter in greater detail.

The shape of the space 515 is so arranged to help an experienced touch typist utilize keyboard apparatus 610 with substantially the same touch typing keystroke techniques as he or she would use on a conventional QWERTY type keyboard arrangement. In this regard, the space 515 between the key groups 514 and 516 is sufficiently wide to facilitate the actuation of the keys in a touch typing manner. Also they are not so far apart as to cause repetitive injuries to the wrist by forcing the user to lock or bend the wrist toward one another. However, the space 515 between the key groups 514 and 516 is not so close as to interfere with the activation of the individual keys in a touch typing procedure. In short, the spacing 515 facilitates conventional touch typing techniques by causing the key groups 514 and 516 to be sufficiently widely spaced apart to position the wrists of the user in a desired relation, and tends to prevent repetitive injuries by helping the wrist of the use to remain straight during actuation of the keyboard.

Considering now the space 515 in greater detail with reference to FIG. 6, the space 515 is generally pentangular in shape having an imaginary right boundary portion 520 defined by the left hand end edge of the right hand character key group 516, and imaginary left boundary portion 521 defined by the right hand end edge of the left hand character key group 514, an imaginary bottom boundary portion 522 defined by the top end edge of the central portion of the space bar key 559 and an imaginary top boundary portion 523 defined by an imaginary line extending between the upper right hand end edge corner of the character key group 514 and the upper left hand end edge corner of character key group 516.

Considering now the imaginary right hand boundary portion 520 of the irregular space 515 in greater detail with reference to FIG. 6, the right boundary portion 520 is staggered and forms a step shaped configuration. The step shaped configuration is complementary shaped to the left boundary portion 521.

As best seen in FIG. 6, the right boundary portion 520 includes a bottom portion 525, a pair of L-shaped step portions 526, 527 and a reverse L-shaped step portion 528. The bottom portion 525 abuts the space bar key 559 at about 90° and extends upwardly therefrom from the lower left hand end edge corner of the N key terminating at about the mid point of the bottom end edge of the H key.

Considering now the step portion 526 in greater detail, the step portion 526 is generally L-shaped having a bottom leg member 526A and a left leg member 526B. The step portion 526 is stepped leftward away from the bottom portion 525 toward the left character key group 514. The bottom leg member 526A abuts the left leg member 526B at about 90° and extends leftward from the top left end edge corner of the N key to the bottom left hand end edge corner of the H key. The left leg member 526B extends between the bottom left hand end edge corner of the H key to the top left hand end edge corner of the H key.

Considering now the step portion 527 in greater detail, the step portion 527 is generally L-shaped having a bottom leg member 527A and a left leg member 527B. The step portion 527 is stepped leftward away from the left leg member 526A toward the character key group 514. The bottom leg member 527A abuts the left leg member 527B at about 90° and extends leftward from the top left hand end edge corner of the H key to the bottom left hand end edge corner of the Y key. The left leg member 527B extends between the bottom left hand end edge corner of the Y key to the top left hand end edge corner of the Y key.

Considering now the complementary L-shaped step portion 528 in greater detail, the portion 528 includes a bottom leg member 528A and a right leg member 528B. The step portion 528 is stepped away from the left character key group 514. The bottom leg member 528A abuts the right leg member 528B at about 90° and extends between the upper left hand end edge corner of the Y key to the bottom left hand end edge corner of the 7 key. The right leg member 528B extends between the bottom left hand end edge corner of the 7 key to the upper left hand end edge of the 7 key.

Considering now the left boundary portion 521 of the irregular space 515 in greater detail, the left boundary portion 521 generally includes a top portion 529, a bottom portion 532 and two stepped portion 530–531.

Considering now the top portion 529, the top portion 529 is configured in a reverse L shape having right leg member 529A and a bottom leg member 529B. The right leg member 529A abuts the bottom leg member 529B at about 90° and extends between the top right hand end edge corner of the 6 key to the bottom right hand end edge corner of the 6 key. The bottom leg member 529B extends between the bottom right hand end edge corner of the 6 key and the top right hand end edge corner of the T key.

Considering now the step portion 530, the step portion 530 is generally L-shaped having a left leg member 530A and a bottom leg member 530B. The left leg member 530A abuts the bottom leg member 530B at about 90° and extends between the top right hand end edge corner of the T key to the bottom right hand end edge corner of the T key. The bottom leg member 530B extends rightwardly from the member 530A between the bottom right hand end edge corner of the T key to the top right hand end edge corner of the G key.

Considering now the step portion 531 in greater detail, the step portion 531 is generally L-shaped having left leg member 531A and a bottom leg member 531B. The left leg member 531A abuts the bottom leg member 531B at about 90° and extends between the top right hand end edge corner of the G key to the bottom right hand end edge corner of the G key. The bottom leg member 531B extends rightwardly from the member 531A between the bottom right hand end edge corner of the G key to the top right hand end edge corner of the B key.

Considering now the bottom member 532 in greater detail, the bottom member 532 is a straight member which extends between the top right hand end edge corner of the B key and the bottom right hand end edge corner of the B key. The bottom member 532 abuts the space bar key 559 at about 90°.

Considering now the left boundary portion 521 in still greater detail, the left boundary portion 521, the step portion 531 extends rightwardly toward the right character group 516 to a greater extent than the step portion 530. In this regard, the right hand end edge of the T key is disposed more leftwardly than the right hand end edge of the G key. The step portion 530 and 531 are also complementary to the step portion 527 and 526 respectively.

Considering now the top boundary portion 523 of the irregular space 515 in greater detail, the top boundary portion 523 is generally defined by an imaginary line extending between the top right hand end edge corner of the 6 key to the top left hand end edge corner of the 7 key. The length of the imaginary line is about 0.9 times the width D of a typical one of the alphanumeric keys, such as the alpha number key for the numeric 1. In this regard, the spacing between the top right hand top corner of the 7 key and the left hand top corner of the 6 key is between about 0.9 D to about 0.3 D. A more preferred spacing is between about 0.5 D to about 0.4 D. The most preferred spacing is 0.5 D.

Considering now the bottom boundary portion 522 of the irregular space 515 in greater detail with reference to FIG. 6, the bottom boundary portion 522 is generally V-shaped and includes a right and portion 522A and a left hand portion 522B. The right hand portion 522A and the left hand portion 522B are disposed at about an angle $\gamma$ relative to one another. The right hand portion 523A extends from the bottom left hand end edge corner of the N key to the top central point of the space bar key 559. The left hand portion 522B extends from the top central point of the space bar key 559 to the bottom right hand end edge corner of the B key.

While particular embodiments of the present invention have been disclosed, it is to be understood that various different modifications are possible and are contemplated within the true spirit and scope of the appended claims. There is no intention, therefore, of limitation to the exact abstract or disclosure herein presented.

What is claimed is:

1. A keyboard apparatus, comprising:

a mount;

a plurality of control key means on the mount arranged in a single substantially unbroken V-shaped row;

at least one control key means of the plurality of control key means having a base perimeter forming a chevron and lying wholly within said unbroken row and serving as a space bar;

a plurality of alpha-numeric key means mounted on the mount arranged in a plurality of broken V-shaped rows, the plurality of alpha-numeric key means being arranged in a QWERTY configuration with said unbroken row to facilitate the entry of keyboard information;

said plurality of alpha-numeric key means including a plurality of right QWERTY key means arranged in rows and staggered columns in a single common plane to facilitate their actuation in a rapid and accurate manner utilizing known and conventional QWERTY right hand digit keystrokes;

each one of said plurality of right QWERTY key means being square in shape;

said plurality of alpha-numeric key means further including a plurality of left QWERTY key means arranged in rows and staggered columns in said single common plane to facilitate their actuation in a rapid and accurate manner utilizing known and conventional QWERTY left hand digit keystrokes;

each one of said plurality of left QWERTY key means being square in shape;

means defining an irregularly shaped space disposed between said right QWERTY key means and said left QWERTY key means for completely separating them to help define said plurality of broken V-shaped rows;

said space being further disposed substantially above said plurality of control key means for helping to define a narrow planar angle $\theta$ between said right QWERTY key means and said left QWERTY key means;

said angle $\theta$ being sufficiently narrow to help cause the forearms of a user to assume a natural position in a non-parallel converging manner to cause the wrists of the user to be maintained in a substantially straight aligned position relative to the hands and forearms when the left hand and right hand digits are resting on the respective left and right QWERTY key means.

2. A keyboard apparatus according to claim 1, further comprising:
   function key means for the entry of ASCII codes, said ASCII codes including dedicated function codes.

3. A keyboard according to claim 2, wherein said plurality of control key means includes a cap lock key and option key, and wherein said function key means includes a shift key, and a tab key for alpha-numeric entry control.

4. A keyboard apparatus according to claim 2, wherein said function key means includes:
   a plurality of numeric keys on the mount, the plurality of numeric keys located to the right of said right QWERTY key means for numeric information entry purposes.

5. A keyboard apparatus according to claim 4, wherein said function key means, further includes:
   a plurality of function keys on the mount for function control, said plurality of function keys being spaced apart from said plurality of numeric keys for facilitating user actuation.

6. A keyboard apparatus according to claim 5, wherein said plurality of function keys are disposed to the left of the plurality of left QWERTY key means.

7. A keyboard apparatus according to claim 2, wherein said function key means includes:
   cursor control key means on the mount spaced from said control key means for controlling the movement of a cursor on a computer screen.

8. A keyboard apparatus according to claim 7, further including a plurality of dedicated key means disposed in a parallel spaced apart relationship relative to said cursor control key means.

9. A keyboard apparatus according to claim 8, wherein said plurality of dedicated key means includes at least two dedicated keys disposed in a spaced apart relationship relative to a top portion of the plurality of left QWERTY key means.

10. A keyboard apparats according to claim 8, wherein said plurality of dedicated key means includes at least one dedicated key disposed in a spaced apart relationship relative to a top portion of the plurality of right QWERTY key means.

11. A keyboard apparatus comprising:
   a housing;
   a plurality of control key means mounted on the housing arranged in a single substantially unbroken V-shaped row to facilitate the entry of control character codes;
   a plurality of alpha-numeric key means mounted on the housing arranged in a plurality of broken V-shaped rows, the plurality of alpha-numeric key means being configured in a QWERTY configuration and arranged with said unbroken row to facilitate the entry of QWERTY alpha-numeric character codes;
   said plurality of alpha-numeric key means including a right hand group of right QWERTY character key means mounted on said housing in rows and staggered columns;
   said plurality of alpha-numeric key means further including a left hand group of left QWERTY character key means mounted on said housing in rows and staggered columns;
   means defining a narrow angle $\theta$ between said right and said left hand group of QWERTY character key means;
   said narrow angle $\theta$ being sufficiently narrow to help cause the forearms of a user to assume a natural position in a non-parallel converging manner to cause the wrists of the user to be maintained in a substantially straight aligned position relative to the hands and forearms when the left hand and right hand digits are resting on the respective left and right character key means;
   said left and right hand groups of QWERTY character key means being separated by a relatively small space to further help the wrists, hands and forearms of the user to be maintained in a substantially straight aligned position relative to one another in a natural, relaxed manner, when the left and right hand digits are resting on the respective left and right character key means;
   said plurality of control key means including elongated common key means configured generally in a V-shape to still further help both sets of the wrists, hands and forearms of the user to be maintained in substantially straight aligned positions when the thumbs of the user actuate said common key means;
   said common key means having a right leg portion being at least partially disposed adjacent to a plurality of the staggered columns in said right hand group of QWERTY character key means to facilitate actuation of said common key means by the right hand thumb of said user;
   said common key means having a left leg portion being partially disposed adjacent to a plurality of the staggered columns in said left hand group of QWERTY character key means to facilitate actuation of said common key means by the left hand thumb of said user;
   said housing having a right hand front edge portion and a left hand front edge portion for facilitating user access to the respective said right hand and left hand groups of QWERTY character key means;
   said right hand front edge portion extending substantially parallel to one imaginary longitudinal line defining the bottom peripheral boundary of said right leg portion of said common key means;
   said left hand front edge portion extending substantially parallel to another imaginary longitudinal line defining the bottom peripheral boundary of said left leg portion of said common key means; and
   said right hand and left hand front edge portions being angularly displaced relative to one another by about $\gamma$ degrees, where $\gamma$ is equal to $180° - \theta$, so the right and left wrists of the user may be disposed adjacent to said right and left groups of QWERTY character key means respectively when the fingers of the user engage them;
   whereby known and conventional touch typing keystroke techniques can be utilized without causing substantial physiological stress to wrists and forearms of the user.

12. A keyboard apparatus according to claim 11, wherein $\gamma$ is about $5\theta$.

13. A keyboard apparatus, comprising:
   a plurality of control key means arranged in a single substantially unbroken row in a common plane to facilitate the entry of control character codes;
   a plurality of alpha-numeric key means arranged in a plurality of broken V-shaped rows, the plurality of alpha-numeric key means being configured in a QWERTY configuration and arranged with said unbroken row to facilitate the entry of QWERTY alpha-numeric character codes;

said plurality of alpha-numeric key means including a right hand group of planar right QWERTY character key means;

said plurality of alpha-numeric key means further including a left hand group of planar left QWERTY character key means;

means defining a narrow planar angle $\theta$ between said right hand group of QWERTY character key means and said left hand group of character key means;

said narrow angle $\theta$ being sufficiently narrow to help cause the forearms of a user to assume a natural position in a non-parallel converging manner to cause the wrists of the user to be maintained in a substantially straight aligned position relative to the hands and the forearms when the left hand and right hand digits are resting on the respective left and right QWERTY character key means;

means defining a generally irregularly shaped space for separating completely said right hand group of character key means from said left hand group of character key means;

said space being configured to further help the wrists, hands and forearms of the user to be maintained in a substantially straight aligned position relative to one another in a natural, relaxed manner, when the left hand digits and right hand digits are resting on the respective left and right QWERTY character key means;

said left and right QWERTY character key means including a plurality of discrete actuation keys each being equally sized and generally rectangularly shaped;

means for mounting said right hand group of QWERTY character key means in columns and rows, said rows being staggered to one another to help facilitate the actuation of said right hand group of QWERTY character keys and a rapid and accurate manner utilizing known and conventional right hand digit touch typing keystroke techniques; and means for mounting said left hand group of QWERTY character key means in columns and rows, said rows being staggered to one another to help facilitate the actuation of said left hand group of QWERTY character keys in a rapid and accurate manner utilizing known and conventional left hand digit touch typing keystroke techniques; and whereby the left hand digits and right hand digits can rest on and stroke individual ones of said plurality of discrete actuation keys utilizing known and conventional touch typing keystroke techniques without causing substantial physiological stress to the fingers, wrists, hand and forearms of the user.

* * * * *

UNITED STATES PATENT AND TRADEMARK OFFICE
CERTIFICATE OF CORRECTION

PATENT NO. : 5,372,441
DATED : December 13, 1994
INVENTOR(S) : William M. Louis

It is certified that error appears in the above-indentified patent and that said Letters Patent is hereby corrected as shown below:

Column 19, line 16, after "claim", delete "4", and substitute therefor --2--.

Signed and Sealed this

First Day of July, 1997

Attest:

BRUCE LEHMAN

*Attesting Officer*    Commissioner of Patents and Trademarks